United States Patent [19]

Hart

[11] Patent Number: 4,887,887
[45] Date of Patent: Dec. 19, 1989

[54] LENS RETAINER FOR OPTICAL ELEMENT

[75] Inventor: Richard T. Hart, Garland, Tex.

[73] Assignee: Varo, Inc., Garland, Tex.

[21] Appl. No.: 203,331

[22] Filed: Jun. 7, 1988

[51] Int. Cl.$^4$ .............................................. G02B 7/02
[52] U.S. Cl. ....................................... 350/252; 350/319
[58] Field of Search ............... 350/252, 257, 318, 319, 350/320, 321, 507, 508, 537, 538; 354/286, 295

[56] References Cited

U.S. PATENT DOCUMENTS

| | | | |
|---|---|---|---|
| 4,303,306 | 12/1981 | Ookawa | 350/252 |
| 4,669,824 | 6/1987 | Wallace | 350/321 |
| 4,684,231 | 8/1987 | Athy | 354/295 |

FOREIGN PATENT DOCUMENTS

| | | | |
|---|---|---|---|
| 256500 | 8/1967 | Austria | 350/252 |
| 57-185006 | 11/1982 | Japan | 350/252 |

Primary Examiner—Rodney B. Bovernick
Assistant Examiner—Loha Ben
Attorney, Agent, or Firm—Baker, Mills & Glast

[57] ABSTRACT

A retainer ring (10) is provided to secure a lens (14) in a lens holder (12). The lens holder (12) has a groove (29) on its internal surface to match the external surface (34) of the ring (10). The lens (14) is placed in the lens holder (12) and the ring (10) is snapped into position in the groove (29) in lens holder (12) to secure the lens (14) therein. The lens holder (12) may then be inserted into an eyepiece (22) on a night vision goggle (20).

8 Claims, 1 Drawing Sheet

LENS RETAINER FOR OPTICAL ELEMENT

TECHNICAL FIELD OF THE INVENTION

This invention relates in general to optical devices, and in particular to a retainer for removably attaching an optical element to an eyepiece in equipment, such as night vision goggle devices.

BACKGROUND OF THE INVENTION

Optical devices such as telescopes, binoculars, microscopes and night vision goggles, each require one or more optical lenses, and often include other accessory attachments. The accessories are typically placed in the optical path with the lens, and may include, for example, protective glass plates or masks, filters and etc. in a holder. Such lenses and accessories are maintained in the optical path by the holder which is snapped or threaded onto the optical device.

Various methods for securing the lens within the lens holder have been previously used. One method typically employed is to form a flange in the lens holder against which the lens is positioned. A ring is then installed against the lens and is secured with an adhesive to the lens and the lens holder. This method is time consuming and subject to error and is therefore expensive. Also, it is difficult to apply the adhesive in an efficient manner to secure the ring and the lens in position without smearing some of the adhesive over the lens, thereby ruining the lens or requiring disassembly of the eyepiece and cleaning.

Another commonly used method is to replace the glued ring with a split snap ring. This method requires the formation of an internal annular groove in the lens holder into which the snap ring fits to maintain the lens in place. The snap ring generally comprises metal, the insertion of which may require pliers and therefore can be difficult and time consuming. Often the lens is scratched or damaged, especially if constructed of plastic, when the ring is compressed and inserted into the annular groove. Also, if the lens is coated with a protective covering such as, for example, a delicate hygroscopic coating (an anti-mist or de-fogging coating), such coating may be damaged or partialy removed by insertion of the ring. Thus, a need has arisen for an optical element retainer which is inexpensive and which can be employed to quickly and easily clamp lenses into a lens holder without damage to the optical elements.

SUMMARY OF THE INVENTION

The present invention disclosed herein comprises an optical element retainer, and a method of construction thereof, which substantially eliminates or reduces problems associated with prior optical element retaining devices. The present invention allows an optical lens to be secured in a holder without damaging the lens.

In accordance with one aspect of the invention, a flexible endless ring is dimensioned to fit into a beveled edge groove in the lens holder. The ring is thus easily snapped in the groove against the lens for holding it tightly in the holder. The lens can be removed simply by pushing on the backside thereof and forcing the endless ring out of the beveled edge groove or by prying the ring from the groove.

In another aspect of the present invention, the ring is constructed of plastic and has a certain degree of radial compressibility. The ring has a generally rounded exterior surface designed to allow easy insertion into a receiving groove in the holder.

A technical advantage of the present invention is that it allows quick and easy insertion into a holder to retain the lens in position without damaging the surface of the lens. It is also a technical advantage that the ring is inexpensive to manufacture and may be reused many times.

BRIEF DESCRIPTION OF THE DRAWINGS

For a more complete understanding of the present invention and for further advantages thereof, reference is now made to the following Detailed Description, taken in conjunction with the accompanying Drawings, in which.

DETAILED DESCRIPTION OF THE INVENTION

Figure 1:
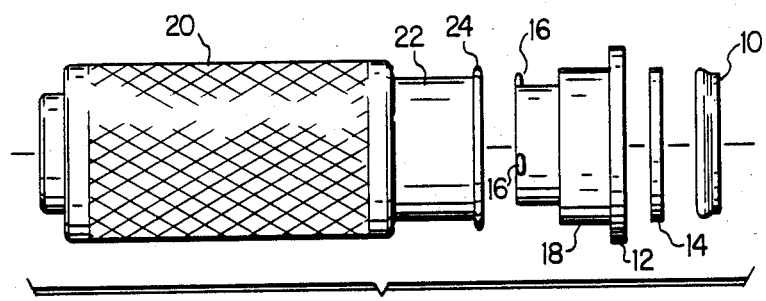
FIG. 1 is an exploded side elevation of the present invention incorporated into an optical device.

In FIGS. 1–4, like items are identified by like and corresponding numerals for ease of reference. Referring to FIG. 1, a retainer ring 10 constructed in accordance with the preferred embodiment of the present invention is shown in a side elevation view. The retainer ring 10 is utilized in conjunction with an optical lens holder 12 to secure a lens 14 therein. The lens 14 may comprise, for example, a clear glass or plastic window, a transparent protective cover, a filter or other optical element for conditioning an optical image.

The optical lens holder 12 functions as a carrier for holding the lens 14 thereto in alignment with an internal optical path. The lens holder 12 is particularly constructed for securing to an optical device such as a night vision goggle 20. In the event the goggle 20 is of the binocular type, two optical paths and thus two eyepieces and lens holders 12 are required. Although not shown, the optical device may also comprise, for example, a telescope, a pair of general purpose binoculars or a microscope. The goggle 20 has an eyepiece 22 into which the lens holder 12 is inserted. The mating ends of the eyepiece 22 and lens holder 12 may be attached together by various appropriate methods (not shown).

Figure 2:
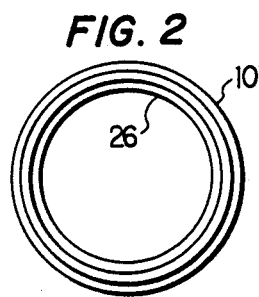
FIG. 2 is an isometric view of the retainer ring in accordance with the present invention.

Referring to FIG. 2, the retainer ring 10 is depicted in isometric view. The retainer ring 10 is a continuous circular ring, preferably constructed of a plastic material having elastic properties which allow a degree of radial compressibility. One plastic resin suitable for use in constructing the ring 10 is available from General Electric under the product name ULTEM. The ring 10 is formed by any appropriate method such as injection molding. It is an important aspect of the invention that ring 10 be radially compressible to allow insertion into holder 12, and then expansion into the annular groove within the lens holder 12. The ring 10 also has a radially inwardly directed rim 26 which will be described below in more detail as to its construction and function.

Figure 3:
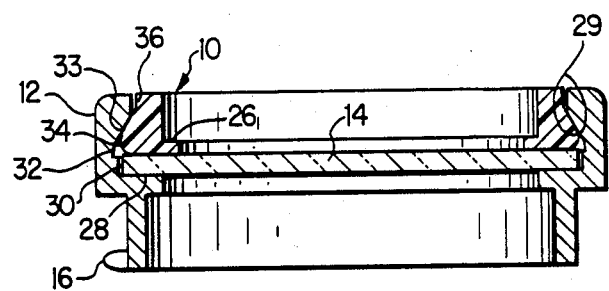
FIG. 3 is a cross-sectional view of a lens holder utilizing a retainer ring in accordance with the present invention.

Referring now to FIG. 3, the preferred embodiment of the present invention is shown in cross-section. The lens holder 12 may be constructed of any suitable material as commonly used in constructing viewing devices, such as aluminum, steel or plastic. The holder 12 has an inner shelf 28 for supporting the lens 14 in abutment therewith and an annular receiving groove generally identified by the reference numeral 29. The shelf 28 has a wall 30 extending orthogonal thereto to keep lens 14 from moving radially. The groove 29 comprises a generally cylindrical portion 32 extending axially from the wall 30. The cylindrical portion 32 is designed to secure the retainer ring 10 therein. Importantly, the portion 32 includes a beveled edge 33 to facilitate the insertion of the ring 10, as well as provide a surface against which the retainer ring 10 can wedge for maintaining pressure against the lens 14. With such a construction the ring is maintained in a radially constricted state, and the natural tendency to expand forces the ring 10 further into the cylindrical portion 32, thereby maintaining pressure on the lens 14 against the shelf 28.

The retainer ring 10 has a generally rounded exterior surface 34 which mates with cylindrical portion 32 in holder 12 and facilitates insertion therein, and withdrawal therefrom. Extending axially from surface 34 of the ring 10 is a generally vertical portion 36 which is designed to help secure the ring 10 within the holder 12. The ring 10 may also be provided with a radially inwardly directed rim 26, distal portion 36, which is provided to help hold lens 14 against ledge 28 of holder 12. In addition, the vertical portion 36 and the rim 26 differentiate the inside and outside of the ring so that personnel can visually insert the ring 10 into the holder 12 in a proper orientation.

Figure 4:
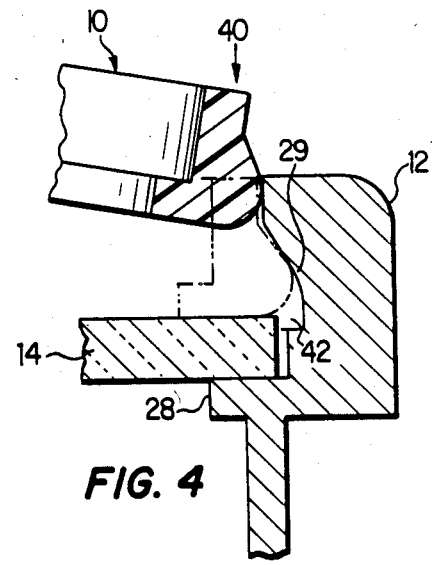
FIG. 4 is an enlarged partial cross-sectional view of a retainer ring being inserted into a lens holder.

Referring to FIG. 4, a partial and enlarged cross-sectional view of the ring 10 is shown. The ring 10 is preferably inserted into the holder 12 at a slightly off-horizontal angle (or vertical depending on orientation of the optical device) to make insertion therein easier. A downward force is applied as indicated by arrow 40 to move only an arcuate part of the ring 10 into position as indicated by dashed lines. The ring 10 radially compresses as the remaining arcuate sections are pressed into the groove 29 in holder 12. As portions of ring 10 are fitted into groove 29, a continued downward force will allow the remaining portions of ring 10 to be inserted into groove 29. As can be appreciated, with such an insertion technique, the entire circumference of the ring 10 need not be compressed at the same time, although the ring 10 could be installed in such a manner. The ring 10 does not bottom out in the groove 29, but rather a space 42 is provided for any misalignment between corresponding parts. More importantly, the space 42 allows for radial expansion of the ring 10, as noted above, to maintain the lens 14 held tightly against the holder shelf 28.

In summary, the endless retainer ring 10 is preferably injection molded from a plastic resin to achieve the compressible characteristics. The retainer ring 10 is formed to have a generally rounded exterior surface 34, a generally vertical portion 36 and a rim 26. A groove 29 is formed within a lens holder 12 that mates with the exterior surface 34.

The lens 14 is inserted into the lens holder 12, and the retainer ring 10 is snapped into groove 29 to securely hold lens 14 in place. The lens holder 12 may then be stored until it is needed or placed into position in an optical device such as the night vision goggle 20. The ring 10 thus securely holds lens 14 in the holder 12 without the necessity for the potentially lens damaging glue ring or metallic split ring.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A retainer for securing a lens in a lens holder, comprising:
    a flexible endless ring comprising a generally rounded exterior surface, a generally vertical portion extending axially from said exterior surface, a radially inwardly-directed rim distal said vertical portion, said ring dimensioned to be radially compressible to snap into a groove formed in the holder to secure the lens between said ring and the holder, and to be radially compressible for removable from said groove.

2. An optical element accessory for use in a night vision goggle, comprising:
    an optical element holder attachable to the night vision goggle;
    a groove in said holder having a generally cylindrical portion for holding said ring and a bevelled surface extending axially and radially inwardly from said cylindrical portion to facilitate insertion of said ring into said cylindrical portion;
    an optical element insertable into said holder; and
    an endless retainer ring dimensioned to snap into said groove in said holder to secure said element between said ring and said holder and prevent radial and axial movement of said element.

3. The accessory of claim 2, wherein said ring further comprises a generally rounded exterior surface to mate with said groove in said holder.

4. A method for manufacturing a retainer for holding a lens in a lens holder, comprising the steps of:
    forming an endless radially compressible ring; and
    dimensioning said ring to fit into a groove in the lens holder to hold the lens between said endless ring and the holder, said groove having a generally cylindrical portion for holding said ring and a bevelled edge extending axially and radially inwardly from said cylindrical portion to facilitate insertion of said ring into said cylindrical portion.

5. The method of claim 4, wherein said step of forming an endless ring comprises injection molding plastic.

6. The method of claim 4, wherein said step of dimensioning said ring comprises:
    forming a generally rounded exterior surface to tightly fit into said groove radially and axially.

7. A retainer for securing a lens in a lens holder, comprising:
    a flexible endless ring dimensioned to be radially compressible to snap into a groove formed in the holder to secure the lens between said ring and the holder, and to be radially compressible for removal from said groove, said groove comprising a generally cylindrical portion for holding said ring and a bevelled surface extending axially and radially inwardly from said cylindrical portion to allow said ring to be easily slipped into and removed from said groove.

8. An optical element accessory for use in a night vision goggle, comprising:
    an optical element holder attachable to the night vision goggle, said holder comprising a ledge for supporting the optical element, and a wall extending axially from said ledge for retaining said element radially;
a groove in said holder;
an optical element insertable into said holder; and
an endless retainer ring dimensioned to snap into said groove in said holder to secure said element between said ring and said holder and prevent radial and axial movement of said element, said groove comprising a generally cylindrical portion extending axially from said wall, and a bevelled surface extending axially and radially inwardly from said cylindrical portion to facilitate insertion of said ring therein.

* * * * *